United States Patent

[11] 3,569,945

[72] Inventor Irving T. Ho
Poughkeepsie, N.Y.
[21] Appl. No. 789,263
[22] Filed Jan. 6, 1969
[45] Patented Mar. 9, 1971
[73] Assignee International Business Machines Corporation
Armonk, N.Y.

[54] LOW POWER SEMICONDUCTOR DIODE SIGNAL STORAGE DEVICE
6 Claims, 3 Drawing Figs.

[52] U.S. Cl. .......... 340/173, 307/281, 307/287, 307/300, 307/324
[51] Int. Cl. .......... G11c 11/36, H03k 4/80
[50] Field of Search .......... 340/173, 173 (NR), 166; 307/281, 287, 324, 300, 284

[56] References Cited

UNITED STATES PATENTS

| | | | |
|---|---|---|---|
| 2,877,359 | 3/1959 | Ross | 340/173X |
| 3,011,155 | 11/1961 | Dunlap | 340/173 |
| 3,034,106 | 5/1962 | Grinich | 340/173 |
| 3,204,044 | 8/1965 | Porter | 340/166X |
| 3,321,745 | 5/1967 | Mansuetto et al. | 340/166 |

*Primary Examiner*—Terrell W. Fears
*Attorney*—Sughrue, Rothwell, Mion, Zinn & Macpeak

ABSTRACT: A PNPN semiconductor diode is connected in series with an additional PN diode to form a bit memory. A bit is stored on the PNPN device by applying a positive voltage sufficiently large to break down the center junction of the PNPN device and increase the minority carriers in the regions adjacent to the center junction. Repetitive small positive voltage pulses maintain the minority carrier condition as a bit memory. A large negative voltage erases the memory cell.

INVENTOR

IRVING T. HO

BY Sughrue, Rothwell, Mion, Zinn & Macpeak

ATTORNEYS

LOW POWER SEMICONDUCTOR DIODE SIGNAL STORAGE DEVICE

BACKGROUND OF THE INVENTION

1. Field of the Invention

This invention relates to a low-power semiconductor signal storage device and more particularly to a two-terminal PNPN diode for the storage of signals on minority carriers.

2. Description of the Prior Art

U.S. Pat. No. 2,877,359 (Ross) discloses a three-terminal PNPN device, for example an SCR, in which an input signal is applied to the third, control terminal to initially set up a minority carrier density within the PNPN deivce. Then a pulse train is applied to the PNPN device to sustain the minority carrier density. The pulses in the train are greater than the minimum sustaining voltage but less that the breakdown voltage. The pulse-on time in the Ross device must be longer that the pulse-off time, thereby defining the shape of the pulse train. In practice, the pulse-on time may be fifty times the pulse-off interval. The Ross system requres a great amount of maintenance power to keep the sustaining or maintenance voltage on almost full time.

U.S. Pat. No. 3,072,804 (Aaronson) discloses a PNPN diode in which minority carrier density is used for a memory function. However, Aaronson does not disclose a system for maintaining the carrier density for a long period of time without appreciable decay.

In prior art systems, it was difficult to build a compact integrated circuit memory system because the available memory cells were too large for use in dense chips. The prior art cells also required a large amount of maintenance power, which, in addition to being uneconomical, means that prior art memory cells dissipated the power as heat, again limiting the size.

SUMMARY OF THE INVENTION

A PNPN diode is initially substantially nonconductive for small values of voltage applied across the diode. But when the applied voltage reaches a predetermined value, typically 10 volts, the diode breaks down and conducts. Hence the predetermined value is called the breadkown voltage.

When the breakdown voltage is applied to the diode, the minority carrier density increases in the N and P regions nearest the center junction. The presence of minority carriers causes an increase in current flow through the diode representing a decrease of diode resistance.

If the breakdown voltage is then removed, the minority carriers remain, decaying through recombination at a rate determined by the parameters of the simiconductor material used. Until the minority carriers decay sufficiently to reduce the voltage across the center junction to zero, the center junction cannot support a reverse bias.

As long as there is no reverse bias, the diode will not block a newly applied forward voltage. A short pulse of newly applied forward voltage will be sufficient to drive the diode on again and to renew the supply of minority carriers.

By using a PNPN diode with only two terminals, the capacitive drain on the system caused by a third control terminal is avoided. The intermediate N and P regions can be made smaller than would be needed if a control lead had to be attached to one of the intermediate regions as in the Ross device. Thus a smaller charge is required to maintain the same charge density.

The present invention can be summarized as a two-terminal PNPN diode in which an initial application of a breakdown voltage across the diode stores minority carriers in the intermediate regions of the diode. Then periodic pulses of a lower sustaining or maintenance voltage are applied across the diode to keep the minority carrier density at a sufficiently high level to maintain the PNPN diode in a condutive state. An additional diode may be provided to reduce the necessary frequency of sustaining pulses.

A memory cell built according to this invention is small because it requires only one two-terminal device per cell. It also has a low-power consumption rate due to the low repetition rate regenerating or restoration pulses used to keep the memory cell in a storage mode.

DESCRIPTION OF THE PREFERRED EMBODIMENTS

Figure 1:
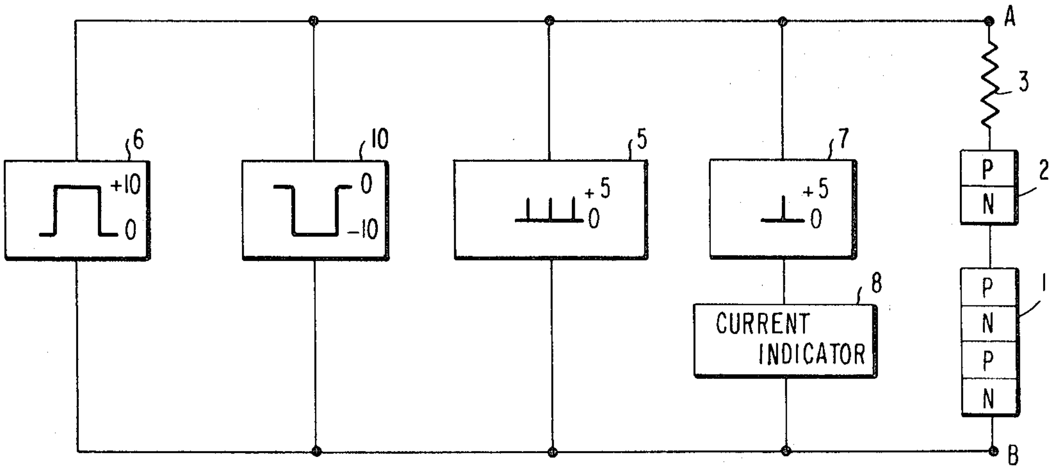
FIG. 1 is a schematic diagram of a memory cell and associated driving sources according to the present invention.
Figure 2:
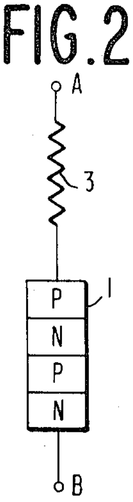
FIG. 2 is a schematic of an alternate memory cell for use in the circuit of FIG. 1.

FIG. 1 illustrates a memory cell and associated driving elements according to the present invention. FIG. 2 illustrates an alternate memory cell for insertion into the device of FIG. 1 at the points A and B.

In FIG. 1 a PNPN diode 1 is connected in series with a PN diode 2 and a resistor 3. Alternatively, diode 2 can be omitted as in FIG. 2.

A pulse generator 5 constantly runs while the memory is in operation. Typically, in the FIG. 2 embodiment, the pulse generator may have a 0.1 percent ON duty cycle, thereby having an ON time of 20 nanoseconds with a 5-volt pulse amplitude and an OFF time of 20 microseconds. During the 20 nanoseconds ON time the pulse generator 5 renews the minority carrier density in the PNPN diode if it is conducting. If it is nonconducting the pulses have no effect, because the 5-volt pulse amplitude is less than the breakdown voltage, typically 10 volts.

If the PNPN diode 1 is nonconducting and it is desired to enter a bit signal into memory in the diode, pulse generator 6 is caused to generate a single positive pulse having an amplitude at least equal to the breakdown voltage. This pulse is applied across the PNPN diode 1, with the P end of the diode driven positive. The resulting breakdown of the junction causes the increase in minority carrier density necessary for signal storage. Subsequently, the minority carrier density will be maintained at a conduction level by pulses from generator 5.

When it is desired to determine whether or not a PNPN diode memory cell is in an ON or a potentially conducting condition (and thereby storing a bit), a sense pulse generator 7 generates a single short pulse having a amplitude less than the breakdown voltage. For example the sense pulse may have an amplitude of 5 volts. The sense pulse is preferably timed to fall approximately midway between sustaining pulses. If PNPN diode 1 is conducting, current indicator 8 will indicate passage of some current, thereby indicating that the diode 1 is conducting.

When it is desired to remove a bit from the memory cell, pulse generator 10 is caused to generate a negative-going pulse of approximately the amplitude of the breakdown voltage. The negative erase pulse may typically be −10 volts, and serves to dissipate the minority carriers.

Of course the memory cell, or an array of such memory cells, can be erased by stopping the sustaining pulses.

Figure 3:
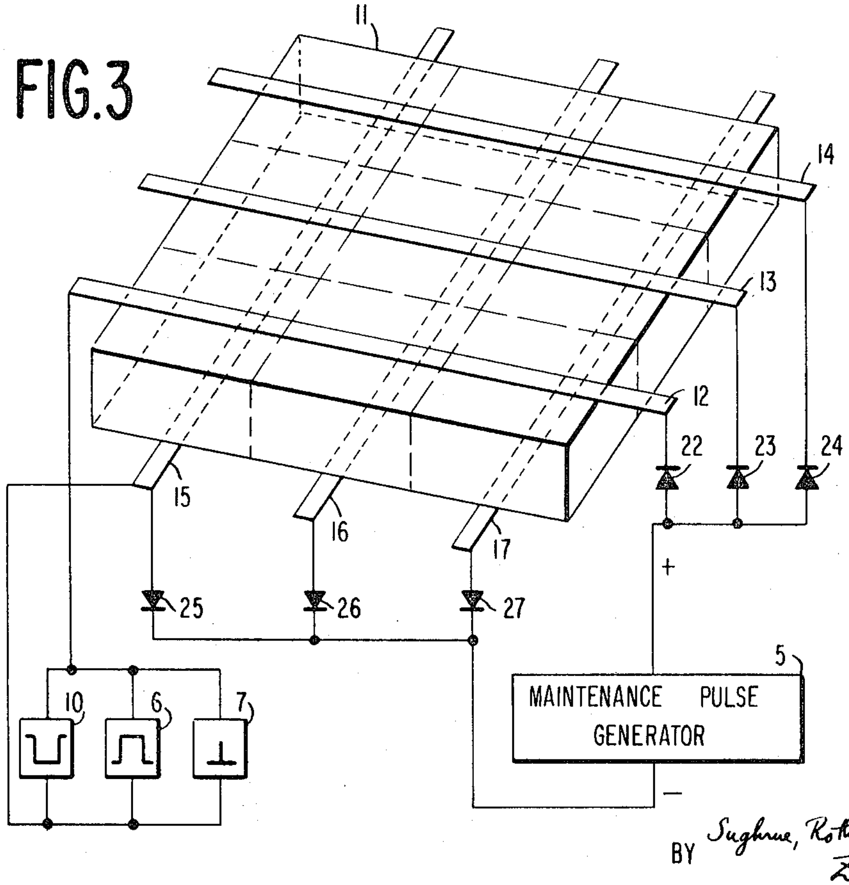
FIG. 3 is a schematic diagram of an array of memory cells according to the present invention.

FIG. 3 is a schematic illustration of a number of PNPN diode memory cells forming part of a planar monolithic array 11 of memory cells. Such a monolithic array, being an integrated circuit arrangement, can be fabricated using known methods. Although only a 3 × 3 array is illustrated, the principle applies to any size array.

Conductors 12—14 are arranged on one end of the array, and orthogonal conductors 15—17 on the other end. The maintenance pulses are applied by generator 5 to these conductors through diodes 22—24 and 25—27. The application of readin pulses 6, readout pulses 7 and memory clear pulses 10 to selected orthogonal pairs of conductors can be arranged in a manner well known in other areas of the memory art.

While the memory will operate in the FIG. 2 embodiment without PN diode 2, the inclusion of this diode 2 reduces the duty cycle by one or even two orders of magnitude. For extremely low-power memories, the inclusion of diode 2 may be preferable.

For certain uses of the device disclosed, for example in FIG. 2, there is a possibility that crosstalk between adjacent cells may present a problem. This problem can be greatly reduced by inserting an additional resistive element between PN device 1 and terminal B in FIG. 2.

Although the device has been described in connection with the FIGS. illustrated, reversal of the signal polarities can be accomplished by reversing the polarities of the PNPN and PN devices.

While the invention has been particularly shown and described with reference to preferred embodiments thereof, it will be understood by those skilled in the art that various changes in form and details may be made therein without departing from the spirit and scope of the invention.

I claim:

1. A low-power semiconductor signal storage system comprising:
  a. a two-terminal semiconductor device having four sequential regions of alternating conductivity types connected between said two terminals, said device having an inherently determined breakdown voltage;
  b. means for applying between said two terminals a pulse of input voltage at least as large as said breakdown voltage and having a polarity arranged to cause the creation of a substantial concentration of minority carriers in the middle two of said sequential regions of alternating conductivity;
  c. means for applying a train of periodic voltage pulses between said two terminals, wherein each of said periodic voltage pulses has an amplitude less than said breakdown voltage, has a polarity arranged to cause periodic restoration of said concentration of minority carriers to eliminate the effects of carrier density decay, and has a pulse duration less than the interval between pulses; and
  d. means for applying between said two terminals a pulse of erasing voltage having a magnitude and polarity arranged to cause a rapid decay in said concentration of minority carriers.

2. A system according to claim 1 wherein said erasing voltage is approximately equal in magnitude to said breakdown voltage and is opposite in polarity to said input voltage.

3. A system according to claim 1 wherein said semiconductor device is a PNPN diode.

4. A system according to claim 3 further comprising means for decreasing the ratio of said pulse duration to said interval between pulses.

5. A system according to claim 4 wherein said means for decreasing said ratio is a PN diode connected in series with said PNPN diode.

6. A system according to claim 3 further comprising means for determining whether or not said PNPN diode is in a substantially conductive condition.